United States Patent

Espíndola et al.

[11] Patent Number: 5,813,795
[45] Date of Patent: Sep. 29, 1998

[54] FINISHING ARRANGEMENT FOR A FRONT PERIPHERAL FLANGE OF A CABINET

[75] Inventors: Estevão Marino Espíndola; Orestes Do Amaral; Rogério Pereira, all of Joinville-SC, Brazil

[73] Assignee: Multibrás S/A Eletrodomésticos, São Paulo - SP, Brazil

[21] Appl. No.: 760,699

[22] Filed: Dec. 5, 1996

[30] Foreign Application Priority Data

Dec. 5, 1995 [BR] Brazil ................................. 9505359-0

[51] Int. Cl.⁶ ......................................................... F16B 2/20
[52] U.S. Cl. .......................... 403/402; 403/309; 403/401
[58] Field of Search ................................. 403/402, 401, 403/294, 394, 375, 300, 335, 336, 309–311, 293, 292, 208; 312/401, 405; 52/656.9, 658, 461, 282.3

[56] References Cited

U.S. PATENT DOCUMENTS

| | | | |
|---|---|---|---|
| 2,100,238 | 11/1937 | Burgess | 52/461 X |
| 3,323,819 | 6/1967 | Barker | 403/402 |
| 4,017,948 | 4/1977 | Vogelbacher | 403/292 X |
| 4,438,578 | 3/1984 | Logan | 403/402 X |
| 4,493,583 | 1/1985 | Wallace | 403/402 |
| 4,616,951 | 10/1986 | Maatela | 403/292 X |
| 4,840,440 | 6/1989 | Dieter | 403/402 X |
| 5,028,165 | 7/1991 | Schools | 403/402 |
| 5,090,835 | 2/1992 | Cox | 403/401 X |
| 5,138,740 | 8/1992 | Goodnow et al. | 403/292 X |
| 5,380,119 | 1/1995 | Madden | 403/402 |
| 5,398,468 | 3/1995 | Erickson | 403/402 X |

*Primary Examiner*—Harry C. Kim
*Attorney, Agent, or Firm*—Darby & Darby

[57] ABSTRACT

A finishing arrangement for a peripheral flange of a cabinet, the flange being formed by two coplanar flange portions (1), orthogonal to each other and separated by a space (2). A finishing element (3) has a midsection that is fitted in the space (2) and has top and bottom parts that are seated against marginal portions of the upper (7) and lower (8) faces of the flange portions (1). The marginal portions of the upper face (7) of the two orthogonal flange portions (1) are recessed by an amount which is substantially equal, but not greater than, the height of the top part (5) of the finishing element (3).

12 Claims, 1 Drawing Sheet

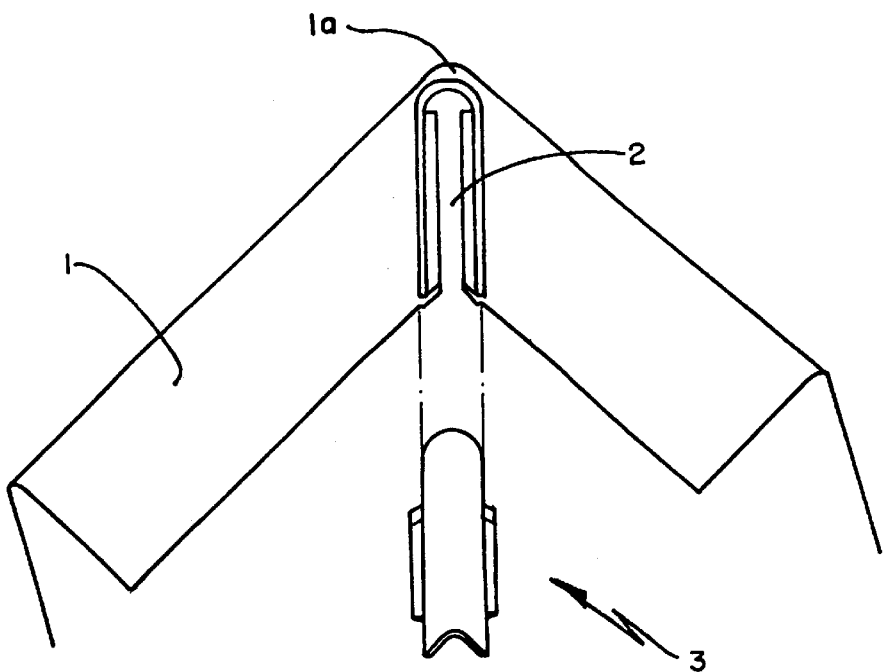
FIG.1
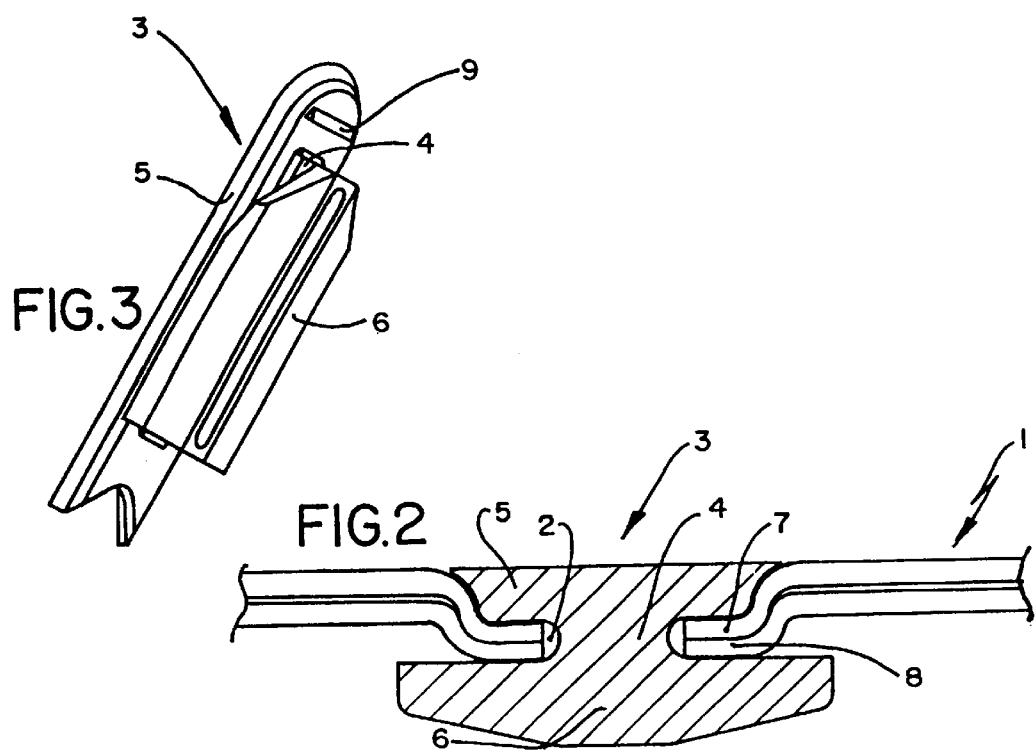
FIG.3
FIG.2

FINISHING ARRANGEMENT FOR A FRONT PERIPHERAL FLANGE OF A CABINET

FIELD OF THE INVENTION

The present invention refers to a finishing arrangement for the peripheral flange onto which the cabinet door is seated, particularly for metallic external cabinets, such as those used in refrigerating appliances.

BACKGROUND OF THE INVENTION

Refrigerating appliances usually comprise an external cabinet, which is mounted surrounding an internal cabinet and which is separated therefrom by an insulating material, said external cabinet being defined by bending a double plate, so as to form the structure of the external cabinet and define its lateral walls, one of said walls being defined by flanges on which a sealing gasket will be seated and against which the door of the refrigerator will be tightly seated, in order to prevent, in the closing condition, humidity from penetrating into the refrigerator, while avoiding the thermal exchange between the internal and external environments of the refrigerating appliance.

One of the causes of poor tightness is associated with the irregularity of the surface defined by the flanges which receive the gasket, this irregularity usually existing at the region of the abutting corners.

In one construction of a cabinet for a refrigerating appliance, the abutting corners are obtained by welding the lateral edges of two adjacent flange portions. In this solution, after the edges of the adjacent wall portions are welded together, usually previously cut at 45°, the abutting corner is sanded before receiving the gasket. Though this solution results in a cabinet without the inconveniences above, it has the disadvantage of requiring an excess of man power and manual operations that make the mounting operation very slow.

In another known solution, the abutting corners receive a finishing by shaping the end edges of each flange during the production of the external cabinet. Though it also minimizes the sealing problems, said solution requires an adequate machinery for cutting and bending the flanges, as well as a larger number of operational steps for producing said cabinet.

Other solutions are also known, in which the finishing is obtained by providing, on the confronting end edges of two adjacent wall portions of the cabinet structure, a corner abutting element, which causes a difference of level in relation to the plane of the face of said adjacent wall portions which receives the gasket and allowing humidity to enter into the cabinet by said region, which humidity is condensed therein, besides permitting loss of cooled air and energy from within the refrigerating cabinet.

DISCLOSURE OF THE INVENTION

Thus, it is an object of the present invention to provide a cabinet for a refrigerating appliance, which can be automatically produced, requiring a minimum of man power operation and leading to a faster assembly, preventing humidity from entering into the cabinet and avoiding loss of cooled air and energy through its wall abutting portions.

This and other objects of the present invention are achieved by a finishing arrangement for a front peripheral flange of a cabinet, said flange being formed by coplanar flange portions, each two flange portions, which are consecutive and orthogonal to each other, being separated by a groove, said arrangement comprising a finishing element having a median portion fitted in said groove and incorporating, at both its upper and lower regions, enlarged portions seated against marginal portions of the upper and lower faces of the flange portions respectively, the marginal portions of the upper face of each two consecutive orthogonal flange portions being recessed by a value which is substantially equal but not lower than the height of the enlarged upper portion of the finishing element.

BRIEF DESCRIPTION OF THE DRAWINGS

The invention will be described below with reference to the attached drawings, in which:

FIG. 1 shows schematically and in a perspective view, part of two flange portions of a refrigerating cabinet defined according to the present invention;

FIG. 2 shows schematically and in a cross sectional view, the groove region defined between two consecutive orthogonal flange portions receiving a finishing element according to the present invention; and FIG. 3 shows schematically a perspective view of the finishing element of FIG. 1.

BEST WAY FOR CARRYING OUT THE INVENTION

According to the illustrations, the present invention comprises a finishing arrangement for the cabinet peripheral flange onto which the cabinet door will be seated, particularly used for an external metallic cabinet of a refrigerating appliance of the type having lateral walls, each two adjacent lateral walls being orthogonal to each other, an upper wall, a lower wall and a front wall.

In the construction of refrigerating appliances with a vertical door, the front wall on which the cabinet door will be seated is defined by a peripheral flange formed by flange portions 1, each extending from one of the lateral, lower and upper walls of the cabinet, said flange portions 1 being coplanar and orthogonal to each other and each two of said flange portions being separated by a respective groove 2, into which there is fitted and retained a corresponding finishing element 3. The length of the groove is determined by the marginal portions of each two consecutive orthogonal flange portions 1.

Each finishing element 3 is produced in a single piece by injection into an adequate mold and comprises a median portion 4 to be fitted in the groove 2 and incorporating, both at its upper and lower regions, enlarged upper and lower portions 5 and 6 to be seated against marginal portions of the upper and lower faces 7 and 8, respectively, of the flange portions 1.

According to the present invention, the marginal portions of both the upper and lower faces 7 and 8 are shaped so as to be equally recessed in relation to the plane of the flange portions 1 by a value that is substantially equal but not lower than the height of the enlarged upper portion 5 of the finishing element 3, in order that an upper face of said enlarged upper portion 5 be substantially coplanar with the peripheral flange, avoiding the appearance of superficial irregularities that may impair the sealing of the cabinet by the sealing gasket installed in this region. In the preferred illustrated construction, steps are defined on the flange portions 1 in each region of the marginal portion of the latter.

In another possible construction, the recess provided for the seating of the finishing element 3 occurs only at the marginal portion 1a of the upper face 7 of each flange portion 1.

In this construction, the marginal portions 7, 8 are lowered along part of the length of the end edge of each respective flange portion 1 that defines a wall of the groove 2, occupying part of the length of the latter from a portion thereof spaced from a vertex region 1a between the respective consecutive orthogonal flange portions 1 and extending up to an external end edge of said groove 2. This gap defines holding means for a retaining element 9 preferably in the form of a retaining tooth provided at the lower face of the upper portion 5 of the finishing element 3, at a mounting region thereof adjacent to the vertex region 1a. The engagement of the retaining element into the holding means avoids involuntary displacements and also the removal of the finishing element 3 from the respective groove 2, after said element 3 has been fitted into said groove. This fitting occurs by a temporary elastic deformation of said retaining tooth 9 during the displacement of the finishing element 3 by the marginal portions of the flange portions 1, until said retaining tooth 9 has been fitted into said holding means. The retaining tooth 9 is dimensioned to have end portions acting against adjacent portions of the edges of each flange portion 1 of the respective groove 2.

Although only one construction for the retaining tooth 9 has been described and illustrated, other constructions are also possible, such as providing said tooth at an opposite end region of one of the upper and lower portions of the finishing element 3, from the respective lower or upper face of said portions and also in the form of lateral projections defined at the end region of each of the lateral walls of the median portion of the finishing element 3 adjacent to the vertex region 1a of the respective groove 2.

Other constructions are also possible, such as that providing a plurality of retaining elements acting in holding means defined as cuts at the lowered marginal portions.

We claim:

1. A finishing arrangement comprising:
   panel having two flange pieces which are substantially orthogonal to each other with opposing edges with a space therebetween, said two flange pieces each having a main section generally co-planar with the main section of the other piece and a marginal portion depressed from said main section at the end thereof containing one of said opposing edges, said depressed marginal portions of said two flange pieces being generally co-planar with each other; and
   a finishing element having a top part and a bottom part joined by a reduced width midsection, said element midsection fitting in said space between said opposing edges of said flange pieces, said top part of said element fitting in said depressed marginal portions over one surface of each of said two flange pieces and substantially covering said one surface of said marginal portions of said flange pieces, and the bottom part of said element overlying the other surface of the marginal portions of each of said flange pieces.

2. A finishing arrangement, as in claim 1 wherein said marginal portion of each said flange piece is depressed from the flange piece main section along only part of the length of said space between said opposing edges.

3. A finishing arrangement, as in claim 1, wherein one of said finishing element and at least one of said marginal portions includes at least one retaining element of a holding means which engages the other of said finishing element and said at least one of said marginal portions to prevent removal of said finishing element from along the length of said space.

4. A finishing arrangement, as in claim 3, wherein said holding means comprises mating interlocking retaining elements on an internal end of said at least one of said marginal portions and one of said midsection, top and bottom parts of said finishing element.

5. A finishing arrangement, as in claim 4 wherein said holding means retaining element is defined by a retaining tooth provided in an end portion of a lower face of said top part of said finishing element.

6. A finishing arrangement, as in claim 1 wherein the height of said finishing element top part is at least equal to the depth of said substantially co-planar flange depressed portions from said substantially co-planar flange main sections.

7. A finishing arrangement as in claim 1, wherein the height of said finishing element top part is substantially equal to the depth of said substantially co-planar flange depressed portions from said substantially co-planar flange main sections.

8. A finishing arrangement as in claim 1 wherein said finishing element top part is longer than said element bottom part.

9. A finishing arrangement, as in claim 8 wherein said marginal portion of each said flange piece extends from its opposing end edge by a length which is shorter than the total length of said space.

10. A finishing arrangement comprising:
    a panel having two flange pieces with opposing edges with a space therebetween, said two flange pieces each having a main section generally co-planar with the main section of the other piece and a marginal portion depressed from said main section at the end thereof containing one of said opposing edges, said depressed marginal portions of said two flange pieces being generally co-planar with each other; and
    a finishing element having a top part and a bottom part joined by a reduced width midsection, said element midsection fitting in said space between said opposing edges of said flange pieces, said top part of said element fitting in said depressed marginal portions over one surface of each of said two flange pieces an substantially covering said one surface of said marginal portions of said flange pieces, and the bottom part of said element overlying the other surface of the marginal portions of each of said flange pieces, wherein one of said finishing element and at least one of said marginal portions includes at least one retaining element of a holding means which engages the other of said finishing element and said at least one of said marginal portions to prevent removal of said finishing element from along the length of said space.

11. A finishing arrangement, as in claim 10, wherein said holding means comprises mating interlocking retaining elements on an internal end of said at least one of said marginal portions and one of said midsection, top and bottom parts of said finishing element.

12. A finishing arrangement as in claim 11 wherein said holding means retaining element is defined by a retaining tooth provided in an end portion of a lower face of said top part of said finishing element.

* * * * *